United States Patent [19]

Schneider

[11] Patent Number: 5,229,589
[45] Date of Patent: Jul. 20, 1993

[54] QUESTIONNAIRE SCANNING SYSTEM EMPLOYING EXPANDABLE ANSWER MARK AREAS FOR EFFICIENT SCANNING AND MARK DETECTION

[75] Inventor: Jeffrey R. Schneider, Levittown, N.Y.

[73] Assignee: Optimum Solutions Corp., Inc., Lynbrook, N.Y.

[21] Appl. No.: 795,849

[22] Filed: Nov. 21, 1991

[51] Int. Cl.$^5$ .............................................. G06K 9/20
[52] U.S. Cl. ..................................... 235/456; 382/61; 382/45
[58] Field of Search ..................... 235/456; 382/61, 45

[56] References Cited
U.S. PATENT DOCUMENTS 5,134,669 7/1992 Keogh et al. ........................ 382/61
5,140,139 8/1992 Shepard ............................. 235/456

Primary Examiner—Paul M. Dzierzynski
Assistant Examiner—Don Wong
Attorney, Agent, or Firm—Philip Young

[57] ABSTRACT

Questionnaires are scanned for answers(marks) hand-marked thereon by defining areas of interest which can be expanded in an area of interest pixel map. An unmarked questionnaire is initialized by scanning to create a pixel map of an original image area, with any printed objects or text on the page being selected as alignment and reference points, rather than requiring timing marks and special registration marks. Areas of interest are defined answer area locations with their original pixel data stored in an initial database. Questionnaire pages are scanned for new answer images thereon by aligning both the page and the individual answer areas, and comparing the scanned page with the stored, unmarked page pixel map, thereby removing the pre-printed area from the newly scanned area to detect any new answers.

16 Claims, 6 Drawing Sheets

FIG. 5
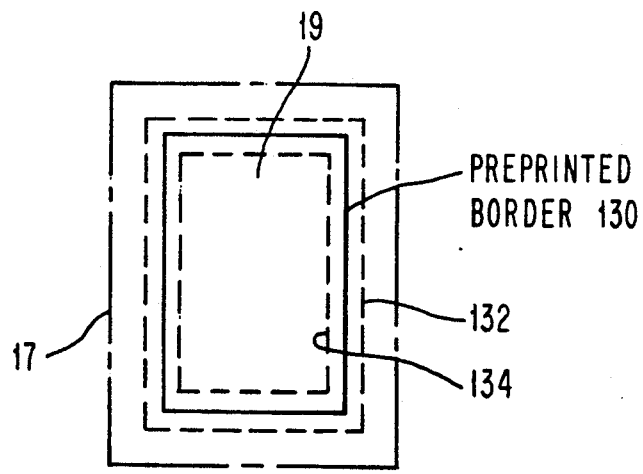
FIG. 6.1
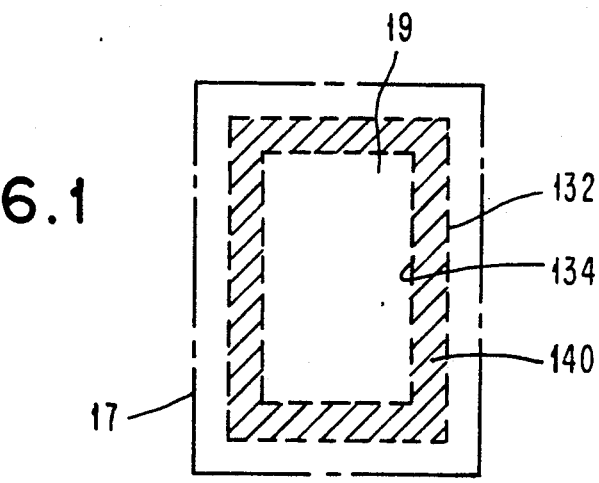
FIG. 6.2
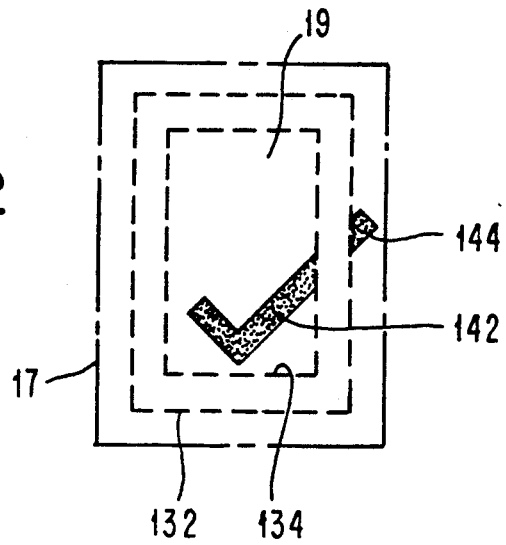

QUESTIONNAIRE SCANNING SYSTEM EMPLOYING EXPANDABLE ANSWER MARK AREAS FOR EFFICIENT SCANNING AND MARK DETECTION

BACKGROUND OF THE INVENTION

1. Field of The Invention

The present invention relates to questionnaire forms and scanning systems employed with such forms and, more particularly, to a method and system for detecting marks on questionnaires.

2. Background Art

Questionnaires for testing, surveys and other purposes have been extensively used with optical mark scanning systems which have been developed to read and detect marks or the absence of marks made in designated response areas. One known system is disclosed in U.S. Pat. No. 4,937,439 to Wanninger et al wherein the survey form has a series of preprinted timing marks, located along one edge of the form, and preprinted quality assurance marks located in a predetermined relationship with the timing track for triggering the system to scan the response areas and for alignment of the response areas for printing and scanning.

In the Wanninger system as well as other known optical scanner systems, the accurate detection of the response areas depends largely upon the ability of the system to detect the timing marks and the accuracy in turning on the optical scanner beam at the precise locations of such response areas. Generally, these systems detect each timing mark and scan each line associated with the timing mark on a real time basis. As a result, errors in locating the response areas are caused by mechanical tolerances in the page feed mechanisms, page skew and the operation of the optical scanner. As pointed out by Wanninger, if the response areas are not printed in relatively exact alignment with the corresponding timing mark, the optical mark reading scanner may interpret the edge of a response area as a positive response or answer mark, rather than as a guide for the user filling in data or an answer mark. Such patentee creates a customized survey form with custom text printed on the form such that only the user is permitted to position the response areas about a series of locations or dots that make up a grid pattern that is aligned in a specified relation with the preprinted timing marks. The computer that operates the scanner utilizes the position data for all the response areas, including the special timing and alignment marks. Such prior art system requires the timing and alignment marks for accuracy in locating the response areas, and also is dependent on the accuracy of the scanners that utilize the response area position data in order to correctly scan the response areas. It is, therefore, desirable to have a scanning system and questionnaire therefor which do not depend on preprinted timing marks and registration marks activating a scanner for accurately locating the answer response area on a real time basis.

Also, in a Cloze type test system adapted for optical scanning and disclosed in U.S. Pat. No. 4,547,161, distractor words, forming a part of an answer, are printed at predetermined locations on a page, and programmably controlled optical scanner apparatus determines which distractor words are to be deleted from the text. Such distractor words are marked by the examinee with a printing device that generates a mark having a different reflectivity than the text. The system requires row marks along the page margin to provide synchronizing signals to enable the scanner apparatus to locate and identify the rows which are being scanned.

SUMMARY OF THE INVENTION

It is an object of the present invention to provide for more accurate scanning of questionnaire forms without requiring preprinted timing marks for activating the scanner and, also, without depending on the mechanical accuracy of the scanner to precisely locate the response areas during scanning.

It is another object of the present invention to provide for more accurate scanning of questionnaire forms without requiring preprinted timing and location marks, and without requiring special inks and pens having prescribed optical reflectivity differing from that of the printed text.

It is another object to provide a questionnaire scanning system which employs image scanning techniques with very accurate image alignment for locating the areas of interest and detecting marks therewithin.

It is a further object to provide a questionnaire scanning system having the ability to analyze detected marks, using their size, density and locations, and determine whether to accept or reject such marks.

These, and other objects, are achieved by the present invention which provides a questionnaire and a scanning system therefor wherein an unmarked questionnaire is initialized by scanning to create a pixel map of an original image area, with printed objects, data or text on the page being selected as alignment and reference points, rather than requiring timing marks and special registration marks. Areas of interest containing answer(mark) area locations are defined on each blank questionnaire by drawing a box around each answer area with a mouse. The pixel data contained within these areas of interest is stored in a database together with the selected alignment and reference point data and subsequently employed during image differencing and answer mark detection processing techniques to determine the presence and nature of answer marks on questionnaires. The preprinted data within the area(s) of interest pixel map is subsequently expanded during image differencing to provide greater accuracy in scanning the completed questionnaire pages and detecting answer marks.

Questionnaire pages are scanned for answer marks by first storing the scanned page image into computer memory. The areas of interest are searched for new marks by (a) locating alignment and reference points on the scanned page and comparing their locations with the stored locations of the alignment reference points associated with the unmarked questionnaire template to determine the X and Y directional differences and the skew correction data of such alignment reference points thereon and applying such directional differences and skew correction data to adjust and align the locations of the areas of interest on the scanned pages as stored in computer memory to correct for movements of the scanned page from the true positions; (b) detecting answer marks on the completed questionnaire pages using such adjusted locations of the areas of interest by floating the pixel images of the stored areas of interest of the unmarked template around the locations of the areas of interest of the newly scanned page image to match and determine the best fit and actual location of the areas of interest on the scanned page, thereby enabling the accurate scanning of the marked questionnaire and the location of its areas of interest; (c) expanding the preprinted data within the area of interest pixel map and (d) image differencing the stored areas of interest with the newly scanned areas of interest, using the best fit locations of the areas of interest on the scanned marked page and the expanded stored areas of interest of the unmarked page pixel map, thereby removing the pre-printed area from the newly scanned area to detect any new answers.

Once the new marks are detected, they are analyzed, using their size, density and locations, to determine whether they should be rejected as a spurious, unintended mark or accepted as a real mark.

BRIEF DESCRIPTION OF THE DRAWINGS

FIG. 5 is an enlarged view of an area of interest with the preprinted square answer border having the areas expanded in both the X and Y directions prior to the image differencing procedure;

FIG. 6.1 shows the area of interest with the enlarged preprinted answer border shown in FIG. 5, while FIG. 6.2 shows the resultant answer mark after image differencing, with the preprinted marks and border which were in the expanded areas being removed, leaving the answer mark.

DESCRIPTION OF THE PREFERRED EMBODIMENTS

Figure 1:
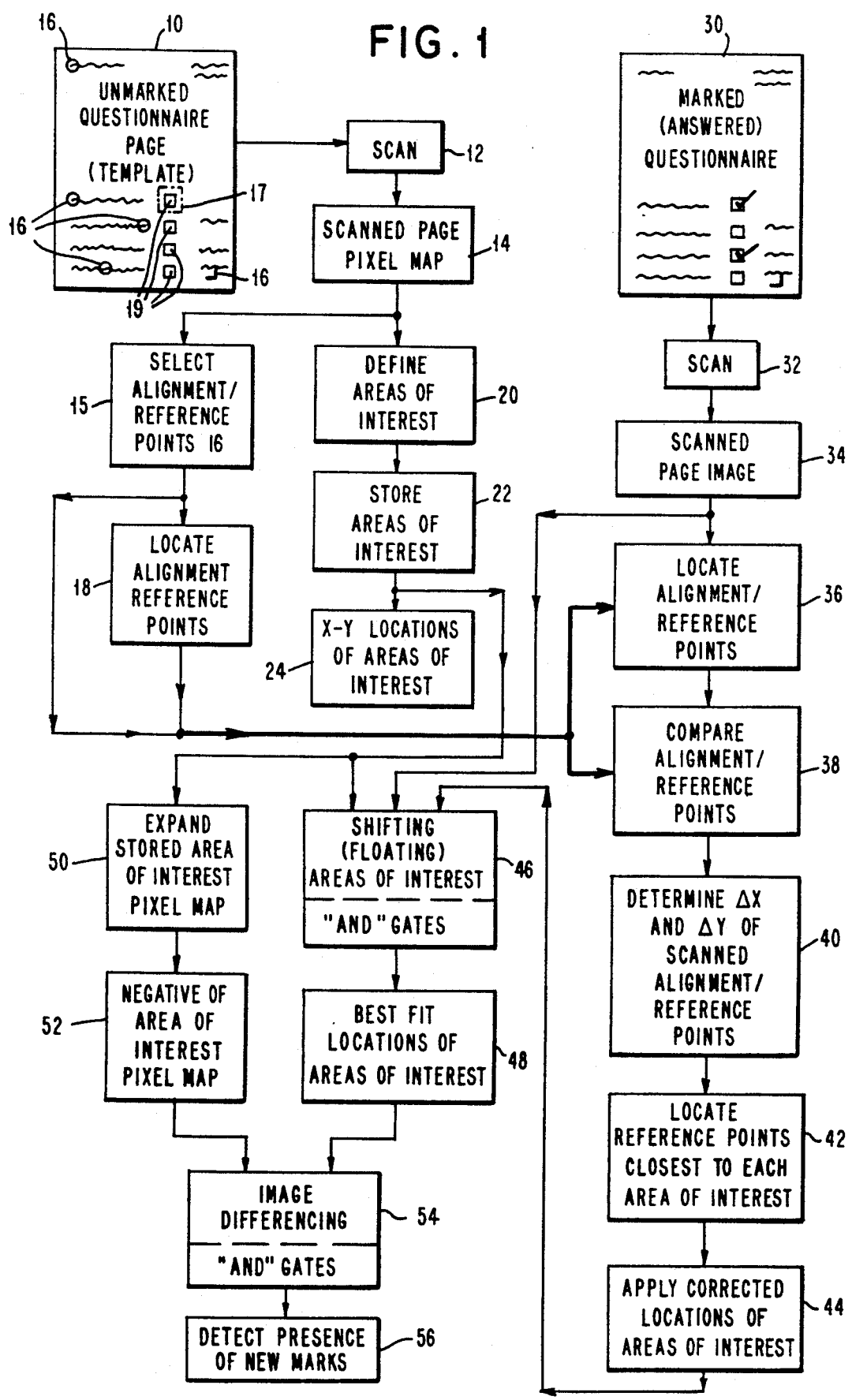
FIG. 1 is a combination system and flow block diagram showing the method for defining the unmarked questionnaire template and the coarse and fine alignment techniques used with the questionnaire image differencing for detecting marks, illustrative of the present invention.

Referring to FIG. 1, there is shown a block diagram flow chart of the operation of the questionnaire and scanning system of the present invention. Here, a template or unmarked questionnaire 10, hereinafter referred to as "template" is defined or "initialized" by scanning at 12 the template 10 to create a pixel map 14 of the template and original image area. Printed objects, data or text on the template 10 are selected as alignment and reference points 16. Up to eight(8) alignment points may be selected per page. The present system permits the use of any printed object, for the alignment reference point, that is repeated in the same location of a defined page. Examples of selected reference points are questionnaire titles having a thick printed text line at the top of the template 10, away from any areas of interest, an individual question title, filled in squares, thick lines and right angles. Where a title is employed as an alignment point, the system sets the top/bottom and right/left points of the alignment mark as the reference points therein. Where a bracket is used as the alignment point, the system may, for example, set the corner of the bracket as the x/y location of the reference point. The alignment reference points are stored at 18 for subsequent use in aligning and correcting for alignment errors in answered or marked pages.

Initialization of the blank questionnaire template 10 also comprises defining areas of interest at 20 containing answer mark area locations by drawing a box 17 around each answer area with a mouse. The answer area 17 may include therewithin some preprinted data, such as a preprinted square border, within an area 19 into which an answer mark is made. In this connection, it is noted that the preprinted border, designated as 130 in FIG. 5, may have other shapes, such as a circle. The pixel data contained within these areas of interest is stored at 22 in a database together with the selected alignment reference point data 18 and subsequently employed during image differencing and answer mark detection processing steps to determine the presence and nature of answer marks on questionnaires. The X and Y locations of the areas of interest are also stored as shown at 24.

Completed questionnaire pages 30 are scanned at 32 for answer marks by first storing the scanned page image 34 into computer memory. A coarse adjustment comprises first locating the alignment and reference points at 36 on the scanned page image 34 and comparing(38) their locations with the stored alignment and reference point locations 18 associated with the unmarked questionnaire template 10 to determine the X and Y directional differences and the skew correction data 40 of such alignment reference points thereon. For each alignment and reference point, there is determined at 42 the point closest to each area of interest so as to provide the most accurate correction in locating the areas of interest on the scanned page 34. This correction process overcomes or minimizes errors caused by the scanning process, such as scanner drag. Thus, such X and Y directional differences and skew correction data at 40 is applied to the scanned page image 34 to calculate at 42 and 44 the corrected locations to adjust and align the locations of the areas of interest on the scanned pages 30 as stored in computer memory to correct for movements of the scanned page from the true positions.

In addition to the above-described coarse adjustment technique for locating the areas of interest on the scanned page, the present invention provides a fine adjustment to more accurately align the location of the areas of interest with their true locations based on the stored template 10 of the unmarked questionnaire. More specifically, the system detects all areas of interest that contain new marks or answers on the scanned page 30. The mark detection technique includes image shifting and image overlay to finely adjust the area of interest pixel map. First, the stored areas of interest represented by the pixel images 22 are "floated" or shifted as shown by block 46, around the newly scanned page image 34 in the vicinity of the newly calculated coarse position of the scanned areas of interest 44 to match and determine the best fit and actual locations 48 of the areas of interest on the scanned page. Here, the saved area of interest map 22 is floated in both the X and Y directions over the newly scanned page image 34 and the pixel AND gate operation applied by an image overlay process until the best fit, as determined by the highest number of matching(enabled) pixels, is determined. This floating and image overlay procedure is described below in connection with FIG. 3. The best fit locations 48 of the areas of interest represents the finely adjusted and accurate actual locations of the areas of interest on marked questionnaire 30.

With the best fit locations of the areas of interest at 48, the stored area of interest pixel map 22 is expanded in the areas adjacent to the preprinted answer border and exclusive "OR"ed at 50 to create a negative of the pixel map 52 around the originally stored area of interest. The process of expanding the area around the preprinted answer border in the saved area of interest pixel map 22 is further described below in reference to FIGS. 3, 5 and 6.1 and 6.2. The use of the best fit location of the stored area of interest pixel map will center the newly scanned area of interest within the expanded area of interest pixel map 52 to enable accurate detection of marks or answers that fall on the border or outside of the originally selected areas of interest.

The system now employs image differencing at 54 to detect the presence of new marks on the scanned questionnaire 30. This is accomplished by "AND"ing together the stored areas of interest 22 and the scanned areas of interest 44, using the best fit locations 48 of the areas of interest on the scanned marked page and the expanded stored areas of interest 52 of the unmarked page pixel map, thereby removing the pre-printed area from the newly scanned area leaving any new marks. This subtraction, or image differencing technique, produces a number of enabled pixels which are counted and such count used to determine at 56 the presence of new marks.

Figure 2:
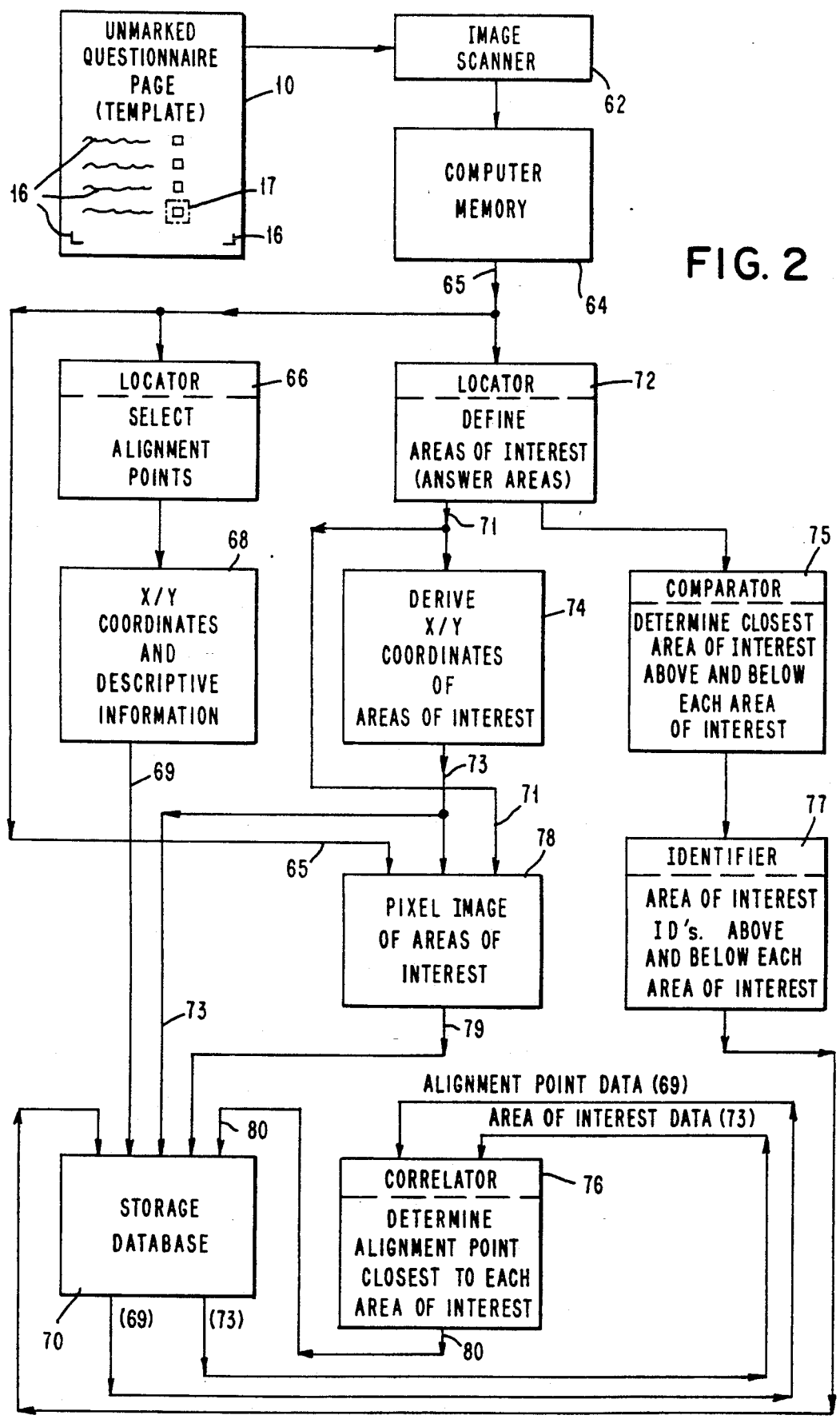
FIG. 2 is a block diagram of the system for setup and initialization of an unmarked questionnaire with selected alignment points for defined areas of interest.

Referring to FIG. 2, there is shown the system portion employed for setup and initialization of the system described above with reference to FIG. 1. Here, the unmarked questionnaire(template) 10 is fed into an image scanner 62 which digitizes the template 10 and sends the information into a computer memory 64. As described above in connection with FIG. 1, alignment points 16 are selected on the template 10, as well as areas of interest 17 being defined using a mouse. The computer memory is accessed on line 65 for the scanned page image data. A locator 66 is employed to select and locate the alignment points 16 with their x/y coordinates and descriptive information taken at 68 and stored via line 69 in a database 70. A second locator 72 is also connected to the computer memory 64 on line 65 and used to find all areas of interest 17 defining the answer areas, with the x/y coordinates of the areas of interest being derived at 74 and stored via line 73 in the database 70. The locator 72 provides on line 71 the data within the areas of interest as well as the x/y coordinate data which is further identified or derived at 74 and sent on line 73 to the database 70. This area of interest data on line 71 and x/y coordinate data on line 73 define pixel images of the areas of interest which are produced at 78 and stored via line 79 in database 70.

A comparator 75 uses the locations of the areas of interest defined by locator 72 to find the closest areas of interest above and below each area of interest and, in turn, marks the areas of interest as such by an identifier 77, which stores the identifier numbers in the database 70. A correlator 76 is connected to the database 70 for accessing the alignment point x/y coordinate data which was received on line 69 from locator 66 and 68 and the area of interest data provided from database 70 from line 73. In turn, correlator 76 determines the alignment point closest to each area of interest and stores this correllation via line 80 in database 70. This correlation data on line 80 is employed to correct and adjust the x/y positions of the areas of interest on the marked questionnaires based on alignment point location changes, as will be described in detail in connection with FIG. 3.

Figure 3:
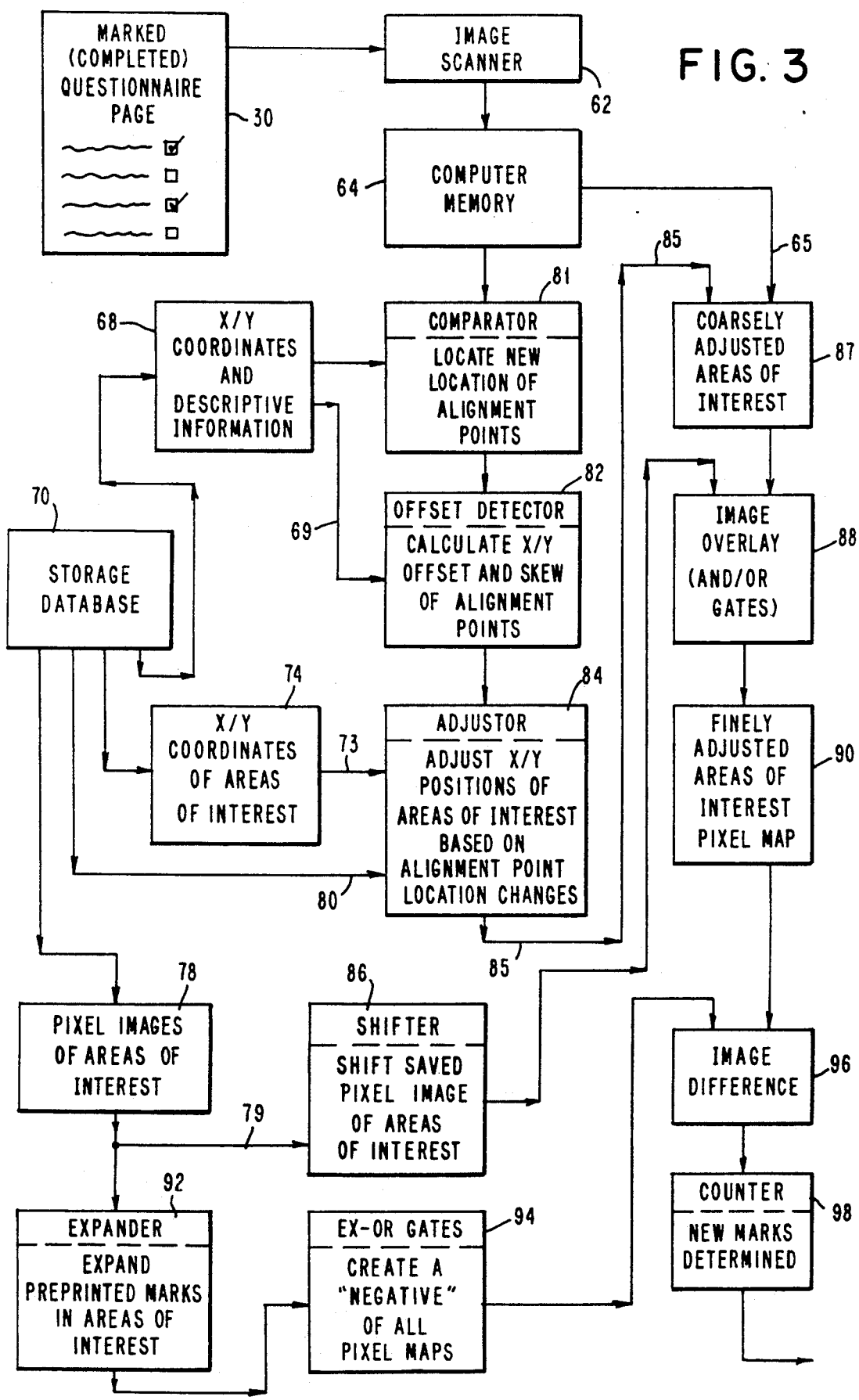
FIG. 3 is a block diagram of the questionnaire scanning system in accordance with the present invention including the mark detection system for scanning a marked questionnaire and determining the presence and content of marks (answers) thereon, such mark detection portion of the system used in combination with the initialization and setup portion of the system shown in FIG. 2 to provide the questionnaire scanning system of the present invention.

FIG. 3 shows the scanning portion of the questionnaire system for processing the marked or completed questionnaire 30 that is fed into the image scanner 62. It is to be pointed out that system elements, such as the image scanner 62, the computer memory 64 and the storage database 70, are common to both the template initialization system shown in FIG. 2 and the scan system shown in FIG. 3 and, therefore, are identified by the same numerals. Image scanner 62 digitizes the marked questionnaires 30 and provides this information to computer memory 64. A comparator 81 finds the new locations of the the newly scanned alignment points by using the x/y coordinates and the descriptive information of the alignment points produced at 68, as described with reference to FIG. 2, and stored in database 70. An offset detector 82 calculates the x/y offsets and skew between the Original location(s) of the alignment point(s) on line 69 and the new location(s) taken from the marked questionnaire at comparator 81. An adjuster 84 applies the x/y offset and skew data from offset detector 82 to coarsely adjust the x/y coordinates of the areas of interest 74 provided on line 73 to their new locations on the marked questionnaire 30. Here, the offset and skew of the alignment points as detected from the scanned, completed questionnaire 30 are taken from the alignment points closest to a particular area of interest provided on line 80 from correlator 76, to adjust at 84 the x/y position of each area of interest. Adjuster 84 provides a "coarsely" adjusted, as contrasted with a "finely" adjusted, area of interest at 87 to be described below in connection with the image overlay process. This corrects and adjusts the locations of the areas of interest on a page in a more accurate manner since the alignment points that have been used as the basis for adjusting a particular area of interest will be the one located closest to the area of interest.

The best fit location of each area of interest is determined by "shifting" or floating the saved pixel image of of each area of interest 78 in a shifter 86, and such shifted images on its output line are gated in an image overlay circuit 88 by AND/OR gates with the areas of interest on output line 85 from adjustor 84 to determine the best fit area of interest This best fit location of each area of interest is determined by a pixel by pixel comparison of the originally stored areas of interest with the newly scanned areas of interest from the adjustor 84. In this fashion, a fine adjustment of the location of the areas of interest of the scanned, marked questionnaire 30 is provided in the image overlay circuit 88 resulting in a finely adjusted area of interest pixel map 90.

Referring again to FIG. 3, there is shown the portion of the system which provides for the expansion of pre-printed marks within the areas of interest to insure that such marks are removed and not mistakenly detected as answer marks. More particularly, an image expander 92 receives the saved area of interest pixel images on line 79 from the database 70 and thickens any pre-printed object in the saved map. This is illustrated in FIG. 5 wherein the area of interest 17 has an answer area border 130 that is thickened in the X and Y directions to the dotted line boundaries 132 and 134, the sizes of which are exaggerated to illustrate this point. Since the saved pixel map is comprised of a group of "0"s and "1"s , where a "1" represents a printed point or mark at that pixel location, any "1" found in the map is expanded into a matrix of "1"s whose width is "X" and whose length is "Y". The width X and length Y are variables that depend upon certain characteristics, such as pixel density, of the scanned page in memory 64. The X and Y expansion results in the border lines 132 and 134 on both sides of the preprinted answer border 130. The expanded matrices can overlap, and overlapping results in an "OR" function, that is, the result of an overlap equals a "1" in the new map. When expansion is complete at 92, exclusive OR gates 94 create a negative of the saved pixel image produced in the expander 92 wherein all "1"s are converted to "0"s and all "0"s are converted to "1"s. This negative is illustrated by FIG. 6.1 wherein the "1" areas within the expanded areas 132 and 134 becomes the blocked out area 140. The negative is provided to an image differencer 96 having AND gates which combine the negative of the saved pixel map 78 with the finely adjusted area of interest pixel map 90 stored in memory 64. This is illustrated in FIG. 6.2 wherein the expanded area 140 shown in FIG. 6.1 has been deleted leaving the answer marks 142 and 144. Thus, this AND gate function of the image differencer 96 is a subtraction process which removes any preprinted object located in the area of interest in memory 64. In this connection, it is pointed out that this expansion function at 92, and the subsequent exclusive OR gate and AND gate functions at 94 and 96, respectively, will remove a maximum of 1/200 th of an inch, per scan line, of any mark on either side of the preprinted border. This is a negligible amount, but the expansion technique provides a far greater degree of accuracy by assuring the removal of essentially all of the pre-printed matter on the originally stored areas of interest in the mark(answer) detection process. After the subtraction process in image differencer 96, a counter 98 counts the number of pixels remaining enabled("1"s) in the new saved areas of interest for use in mark determination.

Figure 4:
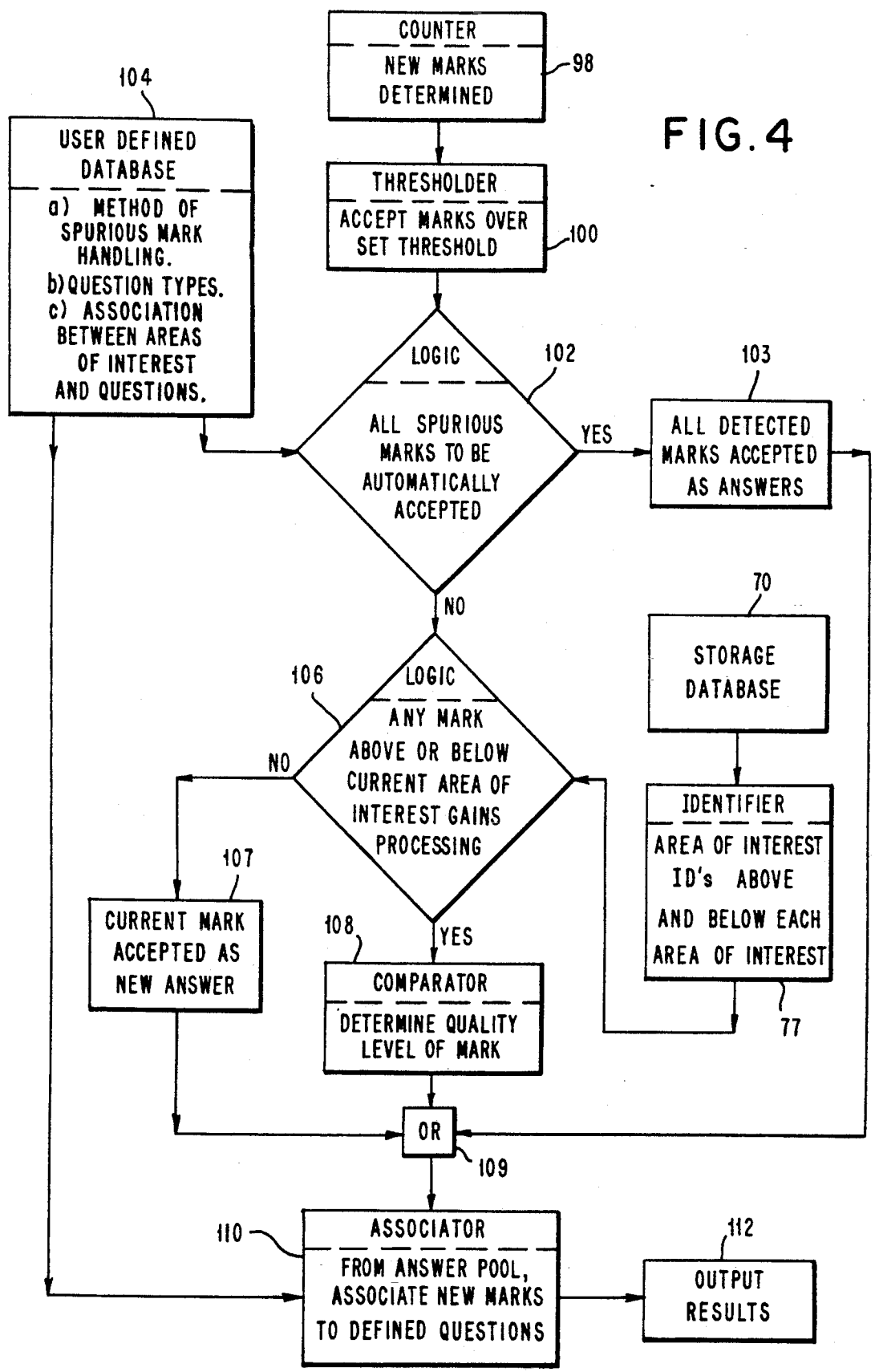
FIG. 4 is a system and logic flow block diagram of the mark determination process.

Referring to FIG. 4, there is shown the system and logic flow block diagram of the mark determination process wherein the results of the counter 98 are passed into a thresholder 100 which accepts those marks having counts above a preset threshold value. A logic circuit 102 determines if all marks represent answers or if additional processing is necessary to determine which, if any, marks are spurious. A user defined database 104 is accessed to determine the method of spurious mark processing. Database 104 defines the method of spurious mark handling, defines types of questions, and defines the association between areas of interest and individual questions. If no additional processing is required, all marks are passed via 103 and OR gate 109 to an associator 110.

Where additional processing is required, a logic circuit 106 makes determinations as to the presence of areas of interest above and/or below the current area of interest. The database 70, as described with reference to FIG. 2, provides from the identifier 77 the area of interest numbers above and below each current area of interest. The data in identifier 77 is used to remove spurious marks from the answer pool being fed to associator 110. A spurious mark is one caused by the tail or another small portion of a real mark that extends into a nearby area. The ratio of the densities of the marks in the adjacent areas is used to determine if the mark is spurious or real. If the ratio of the current mark to the mark above or below the area of interest is less than some given amount A, then the mark is determined to be spurious and is removed from the associated answer pool. If the ratio is greater than A and less than a given amount B, the mark is flagged as being questionable. Depending upon a user selection, the mark will either be automatically accepted or it will be displayed on a monitor for an operator to make the determination as to the realness of the mark. If the ratio is greater than B, the mark is automatically accepted. The values A and B are preset ratios based on the density of the current mark.

Logic circuit 106 determines whether any marks exist in the areas of interest located adjacently above or below the current area of interest. If no such mark(s) exist, the mark is accepted at 107 and passed via OR gate 109 to the associator 110 as a new answer. On the other hand, if such mark(s) does(do) exist, a comparator 108 determines the quality level of the mark. The current mark is fully accepted and passed via OR gate 109 to the associator 110 if the current count in counter 98 is greater than the count associated with the area of interest located above the current area of interest, multiplied by the given value A; and the current count in counter 98 is above the count associated with the area located below the current area of interest, multiplied by the value A. Also, the current mark is flagged as spurious and passed to the associator 110 if the current count is greater than the count in the area of interest located above the current area of interest multiplied by the value B; and the current count is less than the count in the same area of interest located above the current area of interest multiplied by the value A. Also, the current mark is flagged as spurious and passed to associator 110 if the current count is greater than the count in the area of interest located below the current area of interest, multiplied by the value B: and the current count is less than the count in such adjacent lower area of interest multiplied by the value A. Otherwise, the current mark is rejected and further ignored. The associator 110 is now employed to associate the answer pool (detected marks) with the questions defined in the user database 104. Once all areas of interest have been processed and those areas which were marked off by the respondent have been detected and associated, some secondary processing may take place in an output results circuit 112 to determine which marks are correct answers.

Figure 7:
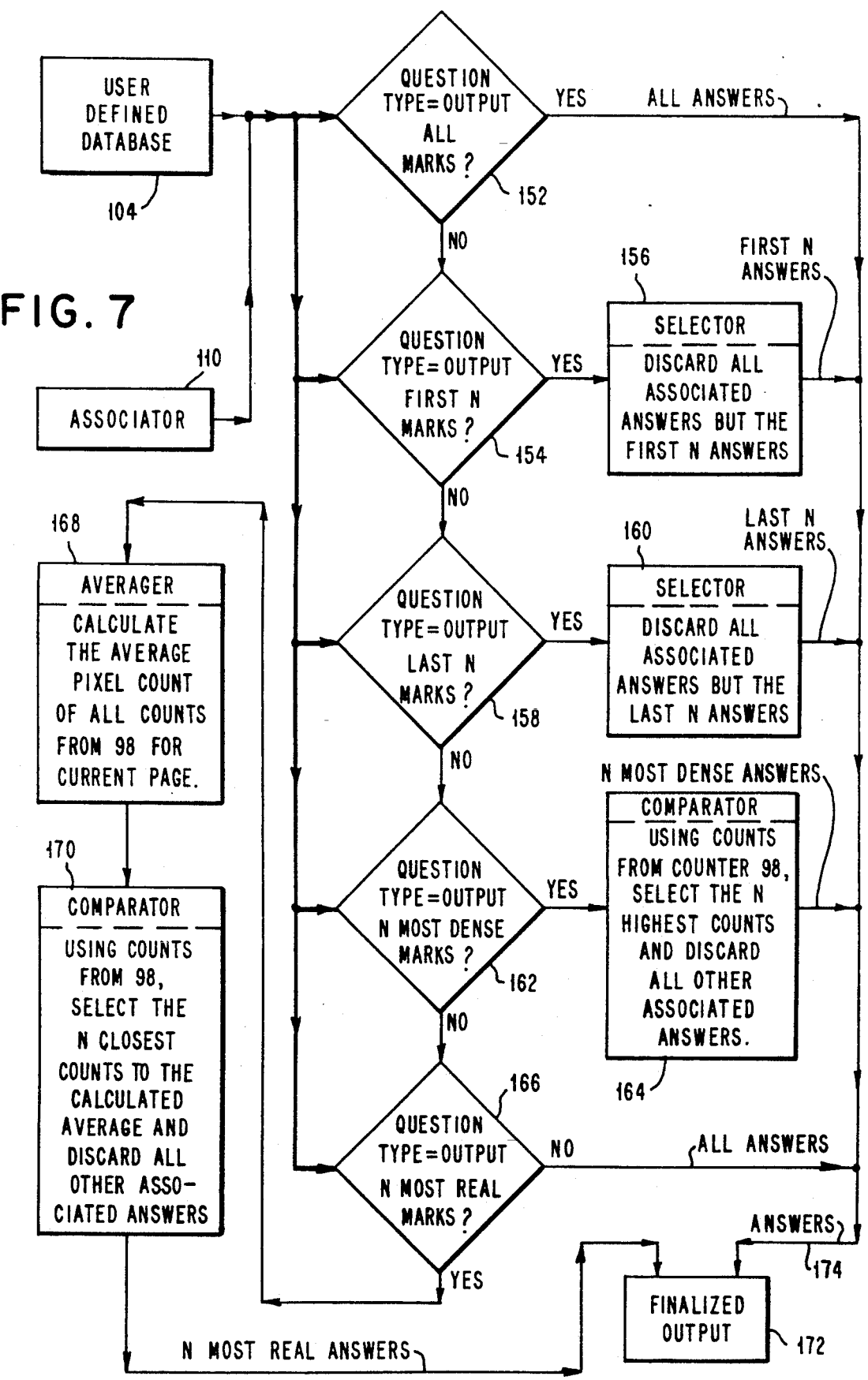
FIG. 7 is a system and logic flow block diagram of the output results process which may reject, as answers, some detected marks based upon user defined questions.

Referring to FIG. 7, there is shown the system and logic flow block diagram of the output results circuit 112 for carrying out secondary mark area processing. When the questionnaire is defined, a number of selections are made for each question. The type of marks to be output as answers and the maximum number of answers, herein referred to as N, to be output for the question are selected. The user defined database 104, which contains the user selected question data, and the associator 110, which contains the associated answer pool(s) for all questions, are connected as shown to logic processing circuits 152, 154, 158, 162 and 166. These logic circuits are used to determine which output processing to perform on the marks associated by associator 110, based on the question data contained in database 104. Five types of output processing are available; (a) output all detected marks, processed through logic circuit 152; (b) output the first N detected mark(s), processed through logic circuit 154 and a selector 156; (c) output the last N detected mark(s), processed through logic circuit 158 and selector 160; (d) output the N most dense mark(s), processed through logic circuit 162 and comparator 164; and (e) output the N most real mark(s), processed through logic circuit 166, an averager 168 and comparator 170.

More particularly, if the question type is "output all detected marks", then the processing path is through logic circuit 152 and all associated answers from associator 110 are retained. If the question type is "output the first N detected mark(s)", then the processing path is through logic circuit 154 and selector 156. Selector 156 accepts the associated answers from associator 110 and selects the first N answers. The order of answers to be output is based on their entry into their system. If the count of detected marks, herein referred to as M, is greater than N, then the last M-N answers are removed by the selector. If N is less than or equal to M, the selector allows all associated answers to pass through. If the question type is "output the last N detected mark(s)", then the processing path is through logic circuit 158 and selector 160. Selector 160 accepts the associated answers from associator 110 and selects the last N answers. If the count of detected marks, M, is greater than N, then the first M-N answers are removed by the selector. If N is less than or equal to M, the selector 160 allows all associated answers to pass through. If the question type is "output the N most dense detected mark(s)", then the processing path is through logic circuit 162 and comparator 164. Comparator 164 accepts the associated answers from the associator 110 and selects the N most dense marks. Here, density is based on the the number of pixels in each area of interest remaining enabled after image differencing, as reported by counter 98. If M is greater than N, comparator 164 removes the M-N least dense marks as determined by counter 98. If N is less than or equal to M, the comparator 164 allows all associated answers to pass through. If the question type is "output the N most real detected mark(s)", then the processing path is through logic circuit 166, averager 168 and comparator 170. Averager 168 is used to calculate the average of all detected marks on the page. This value is passed to the comparator 170 along with the pixel counts from counter 98. The comparator 170 then selects the N answers whose counts are closest to the average count on the page. If M is greater than N, the comparator 170 removes the M-N marks whose counts are furthest from the averagcount. If N is less than or equal to M, the comparator 170 allows all associated answers to pass through. If none of the logic circuits return a true response, then all detected answers are output.

The finalized output 172 of output results circuit 112 will comprise all questions and a subset of the associated answers from associator 110.

While the invention has been described above with respect to its preferred embodiments, it should be understood that other forms and embodiments may be made without departing from the spirit and scope of the present invention.

What is claimed is:

1. A system for scanning a questionnaire for answer marks written thereon, said questionnaire comprised of at least one page having preprinted data thereon, comprising:

image scanning means for initializing an unmarked questionnaire by scanning each unmarked page to create a pixel map thereof;

selecting means for defining selecting alignment points at one or more locations on each said page and detectible on said pixel map;

means for defining, on each said unmarked page, at least one area of interest within which is located an answer mark area location;

means for storing alignment point identifying data and area of interest location data;

said image scanning means including means for scanning a marked, completed questionnaire page for answer marks thereon and creating a pixel map of said completed page;

location means for locating the alignment points on said completed page pixel map;

comparator means for comparing the locations of said alignment points of said completed page pixel map with the locations of corresponding alignment points of said unmarked page pixel map to determine an alignment point shift required to correct for positional offset of the completed page from the unmarked page and true positions of the stored alignment points;

location adjustment means for correcting said area of interest location data by applying said alignment point shift to thereby provide a coarse adjustment of the stored locations of areas of interest to their new positions on the scanned completed pages; and image differencing means, employing said adjusted stored locations of said areas of interest, for subtracting data of the stored areas of interest of the unmarked page pixel map from the data of the areas of interest of the scanned completed page pixel map to remove the common preprinted areas from the scanned completed page to detect any new answer marks.

2. System as recited in claim 1, wherein, said image differencing means includes gating means for floating the area of interest pixel map of the unmarked page around the location of the area of interest pixel map of said completed page to overlay the pixel maps and determine the best fit, and, thus, the best fit area of interest location on said pixel map, and further location adjusting means for applying said best fit area of interest location to said location adjustment means to more accurately adjust the stored location of the area of interest on the scanned completed page, thereby enabling more accurate detection of answer marks in said areas of interest.

3. System as recited in claim 1, wherein said image differencing means includes gating means for expanding the pixel map areas around the preprinted data in said area of interest of said unmarked page by a predetermined amount and number of pixels so that a thickened area around said preprinted data is removed by said image differencing means and not mistakenly detected as an answer mark.

4. System as recited in claim 1, wherein said location adjustment means for correcting said area of interest location data further comprises means for identifying areas of interest with corresponding individual alignment points located the closest thereto on said unmarked page, and means for applying said alignment point shift of the closest alignment point to correct the corresponding stored area of interest location data.

5. System as recited in claim 1, further comprising a user defined database for defining, for each type of question on a questionnaire, the types and criteria for marks to be output as answers, wherein, based on the type of question, selected output processing will be employed for the mark.

6. System as recited in claim 5, further comprising answer output processing means for taking said answer marks, applying said question definitions to said answer marks, and removing unwanted answer marks thereby outputting said defined answers.

7. A system for scanning a questionnaire for answer marks written thereon, said questionnaire comprised of at least one page having preprinted data thereon, comprising:
- image scanning means for initializing an unmarked questionnaire by scanning each unmarked page to create a pixel map thereof;
- selecting means for defining selecting alignment points at one or more locations on each said page and detectible on said pixel map;
- means for defining, on each said unmarked page, at least one area of interest within which is located an answer mark area location;
- means for storing alignment point identifying data and area of interest location data;
- said image scanning means including means for scanning a marked, completed questionnaire page for answer marks thereon and creating a pixel map of said completed page;
- location means for locating the alignment points on said completed page pixel map;
- comparator means for comparing the locations of said alignment points of said completed page pixel map with the locations of corresponding alignment points of said unmarked page pixel map to determine an alignment point shift required to correct for positional offset of the completed page from the unmarked page and true positions of the stored alignment points;
- first location adjustment means for correcting said area of interest location data by applying said alignment point shift to thereby provide a coarse adjustment of the stored locations of areas of interest to their new positions on the scanned completed pages;
- image shifting means including gating means for floating the area of interest pixel map of the unmarked page around the location of the area of interest pixel map of said completed page to overlay the pixel maps and determine the best fit, and, thus, the best fit area of interest location on said pixel map;
- second location adjusting means for applying said best fit area of interest location to said first location adjustment means to provide a fine adjustment of the stored location of the area of interest on the scanned completed page, thereby enabling more accurate detection of answer marks in said areas of interest, and
- image differencing means, employing said coarsely adjusted and said finely adjusted stored locations of said areas of interest, for subtracting data of the stored areas of interest of the unmarked page pixel map from the data of the areas of interest of the scanned completed page pixel map to remove the common preprinted areas from the scanned completed page to detect any new answer marks.

8. A system for scanning a questionnaire for answer marks written thereon, said questionnaire comprised of at least one page having preprinted data thereon, comprising:
- image scanning means for initializing an unmarked questionnaire by scanning each unmarked page to create a pixel map thereof;
- selecting means for defining selecting alignment points at one or more locations on each said page and detectible on said pixel map;
- means for defining, on each said unmarked page, at least one area of interest within which is located an answer mark area location;
- means for storing alignment point identifying data and area of interest location data;
- said image scanning means including means for scanning a marked, completed questionnaire page for answer marks thereon and creating a pixel map of said completed page;
- location means for locating the alignment points on said completed page pixel map;
- comparator means for comparing the locations of said alignment points of said completed page pixel map with the locations of corresponding alignment points of said unmarked page pixel map to determine an alignment point shift required to correct for positional offset of the completed page from the unmarked page and true positions of the stored alignment points;
- location adjustment means for correcting said area of interest location data by applying said alignment point shift to thereby provide a coarse adjustment of the stored locations of areas of interest to their new positions on the scanned completed pages; and
- image differencing means, employing said adjusted stored locations of said areas of interest, for subtracting data of the stored areas of interest of the unmarked page pixel map from the data of the areas of interest of the scanned completed page pixel map to remove the common preprinted areas from the scanned completed page to detect any new answer marks, said image differencing means including gating means for expanding the pixel map areas around the preprinted data in said area of interest of said unmarked page by a predetermined amount and number of pixels so that a thickened area around said preprinted data is removed by said image differencing means and not mistakenly detected as an answer mark.

9. A system for scanning a questionnaire for answer marks written thereon, said questionnaire comprised of at least one page having preprinted data thereon, comprising:
- image scanning means for initializing an unmarked questionnaire by scanning each unmarked page to create a pixel map thereof;
- selecting means for defining selecting alignment points at one or more locations on each said page and detectible on said pixel map;
- means for defining, on each said unmarked page, at least one area of interest within which is located an answer mark area location;
- means for storing alignment point identifying data and area of interest location data;
- said image scanning means including means for scanning a marked, completed questionnaire page for answer marks thereon and creating a pixel map of said completed page;
- location means for locating the alignment points on said completed page pixel map;
- comparator means for comparing the locations of said alignment points of said completed page pixel map with the locations of corresponding alignment points of said unmarked page pixel map to determine an alignment point shift required to correct for positional offset of the completed page from the unmarked page and true positions of the stored alignment points;

location adjustment means for correcting said area of interest location data including means for identifying areas of interest with corresponding individual alignment points located the closest thereto on said unmarked page, and means for applying said alignment point shift of the closest alignment point to correct the corresponding stored area of interest location data and thereby provide a coarse adjustment of the stored locations of areas of interest to their new positions on the scanned completed pages; and image differencing means, employing said adjusted stored locations of said areas of interest, for subtracting data of the stored areas of interest of the unmarked page pixel map from the data of the areas of interest of the scanned completed page pixel map to remove the common preprinted areas from the scanned completed page to detect any new answer marks.

10. A system for scanning a questionnaire for answer marks written thereon, said questionnaire comprised of at least one page having preprinted data thereon, comprising:

image scanning means for initializing an unmarked questionnaire by scanning each unmarked page to create a pixel map thereof;

selecting means for defining selecting alignment points at one or more locations on each said page and detectible on said pixel map;

means for defining, on each said unmarked page, at least one area of interest within which is located an answer mark area location;

means for storing alignment point identifying data and area of interest location data;

said image scanning means including means for scanning a marked, completed questionnaire page for answer marks thereon and creating a pixel map of said completed page;

location means for locating the alignment points on said completed page pixel map;

comparator means for comparing the locations of said alignment points of said completed page pixel map with the locations of corresponding alignment points of said unmarked page pixel map to determine an alignment point shift required to correct for positional offset of the completed page from the unmarked page and true positions of the stored alignment points;

location adjustment means for correcting said area of interest location data by applying said alignment point shift to thereby provide a coarse adjustment of the stored locations of areas of interest to their new positions on the scanned completed pages;

image differencing means, employing said adjusted stored locations of said areas of interest, for subtracting data of the stored areas of interest of the unmarked page pixel map from the data of the areas of interest of the scanned completed page pixel map to remove the common preprinted areas from the scanned completed page to detect any new answer marks;

a user defined database for defining, for each type of question on a questionnaire, the types and criteria for marks to be output as answers, wherein, based on the type of question, selected output processing will be employed for the mark: and answer output processing means for taking said answer marks, and applying said question definitions, from said user defined database, to said answer marks, and removing unwanted answer marks, thereby outputting said defined answers.

11. A method for scanning a questionnaire for answer marks written thereon, said questionnaire comprised of at least one page having preprinted data thereon, comprising:

initializing an unmarked questionnaire by image scanning each unmarked page to create a pixel map thereof, selecting a plurality of alignment points at different locations on said page and detectible on said pixel map, defining, on said unmarked page, at least one area of interest within which is located an answer mark area location, and storing alignment point identifying data, an area of interest pixel map and area of interest location data;

image scanning a completed questionnaire page for answer marks thereon and creating a pixel map of said completed page;

locating the alignment points on said completed page pixel map;

comparing the locations of said alignment points of said completed page pixel map with the locations of corresponding alignment points of said unmarked page pixel map to determine an alignment point shift required to correct for positional offset of the completed page from the unmarked page and true positions of the stored alignment points;

correcting said area of interest location data by applying said alignment point shift to thereby provide a coarse adjustment of the stored locations of areas of interest to their new positions on the scanned completed pages; and image differencing the stored areas of interest of the unmarked page pixel map with the areas of interest of the scanned completed page pixel map to remove the common preprinted areas from the scanned completed page to detect any new answer marks.

12. Method as recited in claim 11, wherein the step of correcting said area of interest location data further comprises the step of identifying areas of interest with corresponding individual alignment points located the closest thereto on said unmarked page, and applying said alignment point shift of the closest alignment point to correct the corresponding stored area of interest location data.

13. Method as recited in claim 11, wherein, prior to said step of image differencing, further comprising the step of floating the area of interest pixel map of the unmarked page around the location of the area of interest pixel map of said completed page to overlay the pixel maps and determine the best fit and more accurately adjust the stored location of the area of interest on the scanned completed page, thereby enabling more accurate detection of answer marks in said areas of interest.

14. Method as recited in claim 11, wherein, prior to said image differencing step, further comprising the step of expanding the pixel map areas around the preprinted data in said area of interest of said unmarked page so that a thickened area around said preprinted data is removed during said image differencing step and not mistakenly detected as an answer mark.

15. Method as recited in claim 11, further comprising the step of defining, for each type of question on a questionnaire, the types and criteria for marks to be output as answers, wherein, based on the type of question, selected output processing will be employed for the mark.

16. Method as recited in claim 15, wherein said output processing comprises taking said answer marks, applying said question definitions to said answer marks, and removing unwanted answer marks thereby outputting said defined answers.

* * * * *